(12) United States Patent
Mandal et al.

(10) Patent No.: US 9,753,170 B2
(45) Date of Patent: Sep. 5, 2017

(54) SOURCELESS DENSITY DETERMINATION APPARATUS, METHODS, AND SYSTEMS

(71) Applicant: Halliburton Energy Services, Inc., Houston, TX (US)

(72) Inventors: Batakrishna Mandal, Missouri City, TX (US); Arthur Cheng, Houston, TX (US); Nigel Clegg, Norwich (GB); Jennifer Anne Market, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/650,808

(22) PCT Filed: Dec. 31, 2012

(86) PCT No.: PCT/US2012/072327
§ 371 (c)(1),
(2) Date: Jun. 9, 2015

(87) PCT Pub. No.: WO2014/105088
PCT Pub. Date: Jul. 3, 2014

(65) Prior Publication Data
US 2015/0378040 A1 Dec. 31, 2015

(51) Int. Cl.
*G01V 1/30* (2006.01)
*G01V 1/50* (2006.01)
*G01V 1/44* (2006.01)

(52) U.S. Cl.
CPC ............ *G01V 1/50* (2013.01); *G01V 1/306* (2013.01); *G01V 1/44* (2013.01); *G01V 2210/6222* (2013.01); *G01V 2210/6224* (2013.01)

(58) Field of Classification Search
CPC . G01V 1/44; G01V 1/50; G01V 1/306; G01V 2210/6224; G01V 2210/6222
USPC ...................................... 367/25, 35
See application file for complete search history.

(56) References Cited

U.S. PATENT DOCUMENTS

| 4,701,891 A | 10/1987 | Castagna et al. |
|---|---|---|
| 6,050,141 A | 4/2000 | Tello et al. |
| 6,324,477 B1 | 11/2001 | Bork |
| 7,656,747 B2 | 2/2010 | Mandal et al. |

(Continued)

FOREIGN PATENT DOCUMENTS

| RU | 1806388 A3 | 3/1993 |
|---|---|---|
| SU | 603933 A1 | 4/1978 |

(Continued)

OTHER PUBLICATIONS

"Australian Application Serial No. 2012397816, First Examiner Report mailed Mar. 17, 2016", 2 pgs.

(Continued)

*Primary Examiner* — Daniel L Murphy
(74) *Attorney, Agent, or Firm* — Gilliam IP PLLC

(57) ABSTRACT

In some embodiments, an apparatus and a system, as well as a method and an article, may operate to determine a compressional velocity (CV) of a geological formation, to determine a reflection coefficient (RC) associated with the geological formation, and to determine a density of the geological formation based on the CV and the RC. The CV and RC may be determined from values associated with sonic and ultrasonic velocity measurements. Additional apparatus, systems, and methods are described.

20 Claims, 9 Drawing Sheets

(56) References Cited

U.S. PATENT DOCUMENTS

| | | |
|---|---|---|
| 2007/0005251 A1 | 1/2007 | Chemali et al. |
| 2007/0019506 A1 | 1/2007 | Mandal et al. |
| 2008/0186805 A1 | 8/2008 | Han |
| 2008/0312864 A1 | 12/2008 | Zou |
| 2009/0185447 A1 | 7/2009 | Yogeswaren et al. |
| 2010/0095757 A1 | 4/2010 | Hansen |
| 2011/0168879 A1 | 7/2011 | Evans et al. |
| 2011/0284314 A1 | 11/2011 | Oraby |

FOREIGN PATENT DOCUMENTS

| | | |
|---|---|---|
| SU | 1649482 A1 | 5/1991 |
| WO | WO-2012/027848 A1 | 3/2012 |
| WO | WO-2014105088 A1 | 7/2014 |

OTHER PUBLICATIONS

"Canadian Application Serial No. 2,895,025, Office Action mailed Jun. 6, 2016", 3 pgs.

"European Application Serial No. 12891140.1, Extended European Search Report mailed Jul. 21, 2016", 8 pgs.

"European Application Serial No. 12891140.1, Office Action mailed Jul. 24, 2015", 2 pgs.

"European Application Serial No. 12891140.1, Reply mailed Oct. 8, 2015 to Office Action mailed Jul. 24, 2015", 8 pgs.

"International Application Serial No. PCT/US2012/072327, Response filed Oct. 23, 2014 to Written Opinion mailed Sep. 2, 2013", 2 pgs.

"Russian Federation Application Serial No. 2015122489, Office Action mailed Mar. 28, 2016", (w/ English Translations), 21 pgs.

"Russian Federation Application Serial No. 2015122489, Response filed Aug. 11, 2016 to Office Action mailed Mar. 28, 2016", (w/ English Translation of Claims), 11 pgs.

"International Application Serial No. PCT/US2012/072327, International Preliminary Report on Patentability mailed Mar. 4, 2015", 6 pgs.

"International Application Serial No. PCT/US2012/072327, International Search Report mailed Sep. 2, 2013", 3 pgs.

"International Application Serial No. PCT/US2012/072327, Written Opinion mailed Sep. 2, 2013", 5 pgs.

Quijada, M. F., et al., "Density estimations using density-velocity relations and seismic inversion", CREWES Research Report . vol. 19, (2007), 1-20.

"Canadian Application Serial No. 2,895,025, Office Action mailed Jan. 10, 2017", 3 pages.

"Chinese Application Serial No. 201280077537.7, Office Action mailed Aug. 18, 2016.", 6 pages (15 pages total w/English translation).

"Chinese Application Serial No. 201280077537.7, Office Action mailed Apr. 24, 2017.", 3 pages.

SOURCELESS DENSITY DETERMINATION APPARATUS, METHODS, AND SYSTEMS

PRIORITY APPLICATIONS

This application is a U.S. National Stage Filing under 35 U.S.C. 371 from International Application No. PCT/US2012/072327, filed on 31 Dec. 2012, which application is incorporated herein by reference in its entirety.

BACKGROUND

In drilling wells for oil and gas exploration, understanding the structure and properties of the geological formation, including its density, provides information to aid such exploration. Logging is the process used most often to make measurements (via sensors located down hole) of formation characteristics to provide this information.

Some of the sensors used in logging operations include sonic and ultrasonic sensors. While attempts have been made to determine formation density from sonic measurements, the results have been unreliable, because borehole irregularities along the length of the transmitter-receiver array can greatly affect the final result.

DETAILED DESCRIPTION

To address some of the challenges described above, as well as others, apparatus, systems, and methods are described herein that operate to determine the density of a geological formation using a combination of sonic and ultrasonic measurements made within a borehole. For the purposes of this document, sonic measurements are made using frequencies below 50 kHz, and ultrasonic measurements are made using frequencies above 100 kHz.

Sonic frequency measurements indicate wave velocity in a formation. Ultrasonic frequency measurements indicate borehole fluid (mud) velocity and formation impedance. Since the impedance equals the density times the velocity, obtaining the velocity and the impedance of the formation enables calculating its density. Thus, using azimuthal sonic and ultrasonic measurements, the azimuthal density can be determined. Since the depth of investigation is shallow, the impedance measurement is also shallow, and the velocity dispersion between ultrasonic and sonic waves should be minor.

Figure 1:
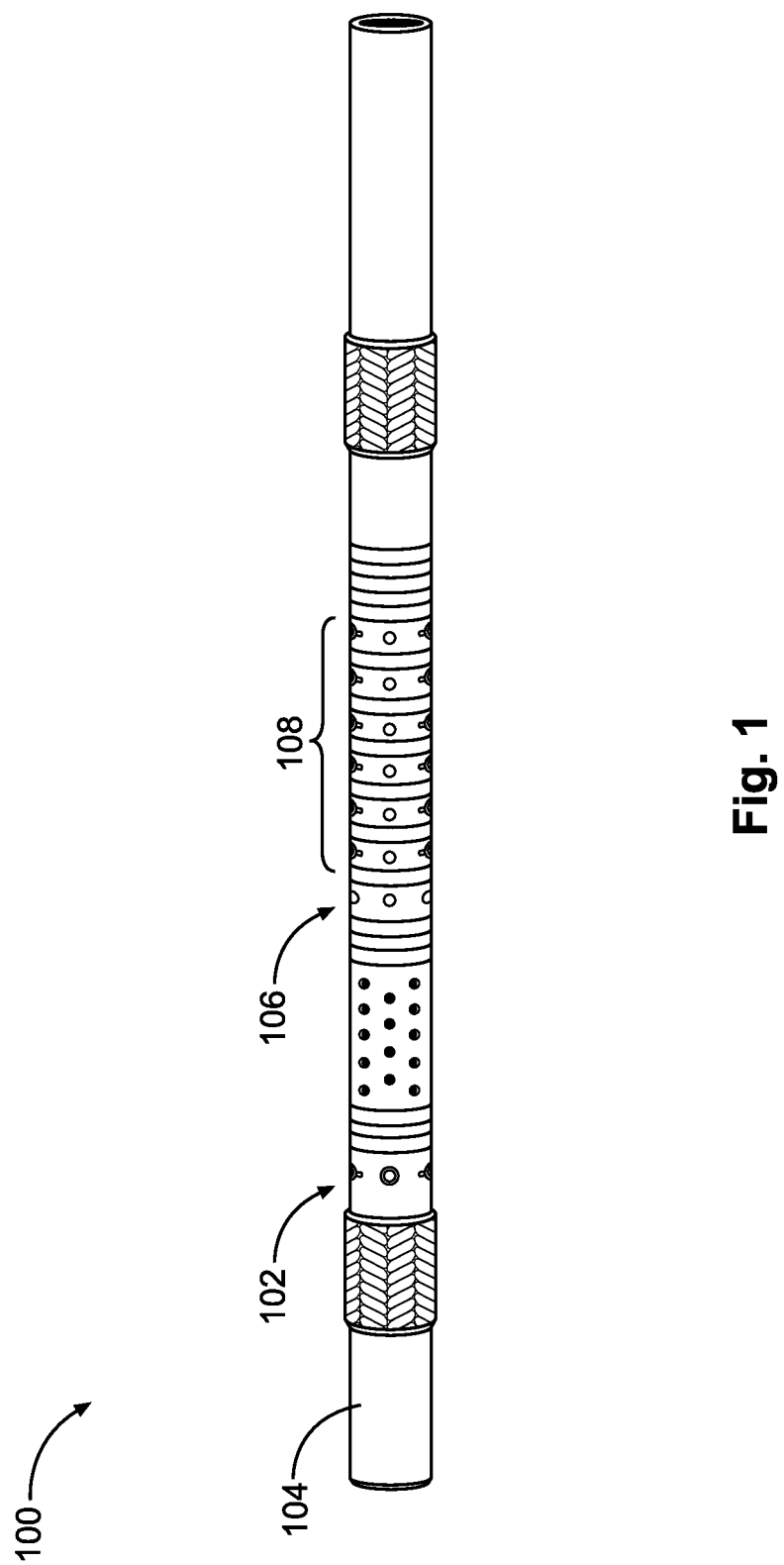
FIG. 1 is a perspective view of an apparatus, according to various embodiments of the invention.

FIG. 1 is a perspective view of an apparatus 100, according to various embodiments of the invention. In this case, the apparatus 100 comprises a housing 104 (e.g., a down hole tool) attached to transmitters 102, ultrasonic sensors 106, and sonic sensors 108. In some embodiments, the transmitters 102 comprise sonic transmitters, or ultrasonic transmitters, or both. In some embodiments, the ultrasonic sensors 106 comprise ultrasonic caliper transducers, such as pitch-catch or pulse-echo transducers that can operate as both ultrasonic transmitters and ultrasonic receivers.

The sonic transmitters 102 and sensors 106, 108 may comprise one-dimensional or two-dimensional arrays of transmitters 102 and sensors 106, 108, respectively. For example, the sensors 106 in the apparatus 100 may comprise a one-dimensional array of four ultrasonic caliper transducers, together with four one-dimensional linear arrays of six sonic sensors 108 (or a two-dimensional array of twenty-four sonic sensors 108), each of the linear sonic sensor arrays associated with one of the sonic transmitters 102.

In many embodiments, ultrasonic and sonic measurements provided by the apparatus 100 are combined and used to estimate formation density. Formation compressional slowness is estimated by using each sonic sensor array, or by using all four of the arrays summed together. For this part of the process, standard estimation methods that are known to those of ordinary skill in the art, such as time semblance, can be used. This results in an averaged formation compressional velocity that is measured between the sonic transmitters 102 and the arrays of sonic sensors 108, or in between the arrays of sonic sensors 108. Thus, one set of measurements in the process of determining formation density is taken using sonic sensors 108.

Figure 2:
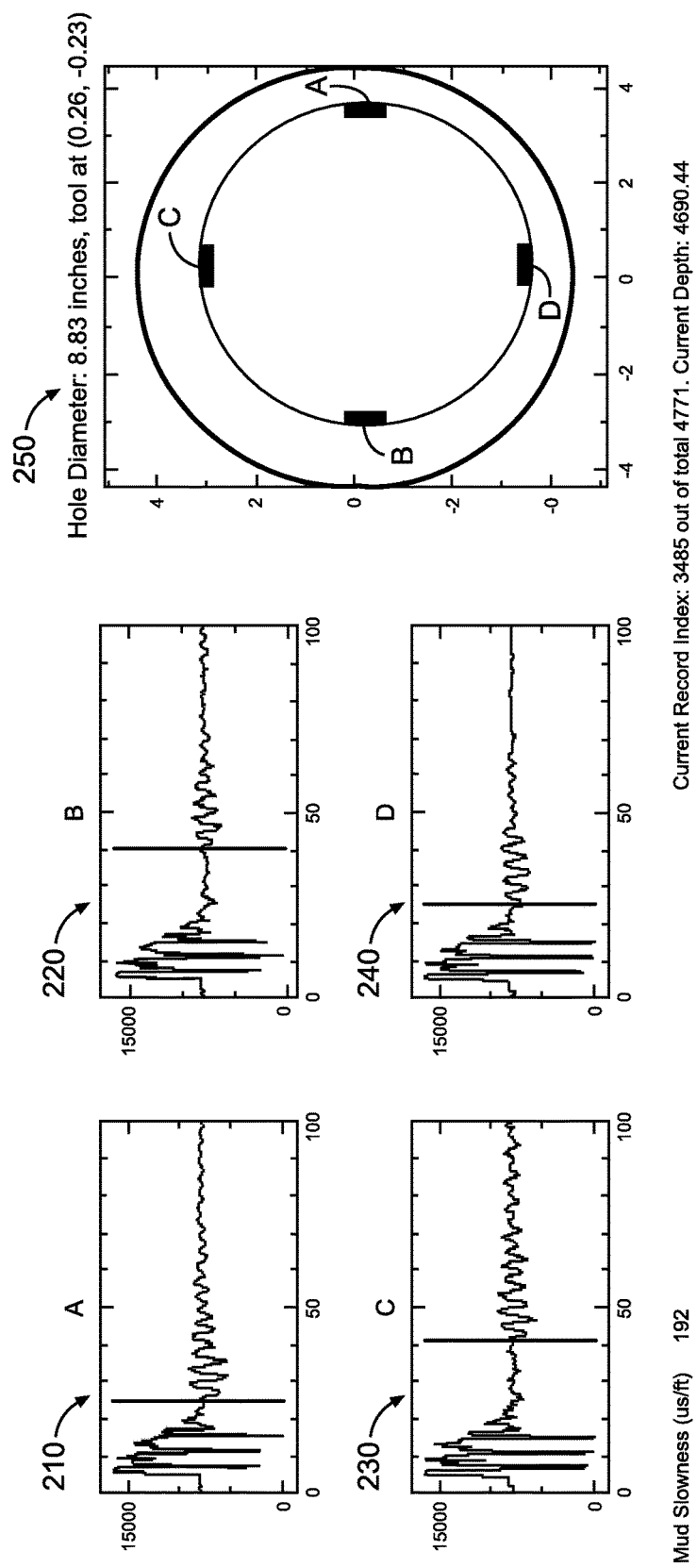
FIG. 2 includes ultrasonic signal graphs, with a plot of the corresponding borehole size and tool position according to various embodiments of the invention.

FIG. 2 includes ultrasonic signal graphs 210, 220, 230, 240, with a plot 250 of the corresponding borehole size and tool position according to various embodiments of the invention. Here the acoustic reflection signals obtained by each of the sensors 106 (see FIG. 1) comprising ultrasonic calipers can be seen. Graphs 210, 220, 230, 240 correspond to the signals provided by transducers A, B, C, D, noted in the plot 250, where the resulting borehole size and tool position estimates are shown.

The ultrasonic caliper transducers A, B, C, D are configured to measure ultrasonic signal reflections from the borehole wall. The travel time of the reflection is used to estimate the borehole fluid velocity, and the diameter and shape of the borehole, as shown in the figure. The travel times of the reflections at each individual sensor (e.g., transducers A, B, C, and D in the array of sensors 106) are indicated by a vertical line crossing the signal trace in each in the graphs 210, 220, 230, 240 as is known to those of ordinary skill in the art. The travel times are then used, together with a mud velocity estimate, to provide a borehole size determination.

The mud velocity can be estimated by operating the sensors 106 in a casing with a known size, or by direct measurement of the mud characteristics at the surface, from which down hole results (taking into account down hole pressure and temperature) can be extrapolated. A separate down hole mud sensor can also be used to determine the mud velocity.

The amplitude of the reflected pulse, in addition to the travel time, can be used to estimate a reflection coefficient of the borehole wall. The amplitude of the pulse can be corrected for the propagation path attenuation, using the actual distance traveled—via travel time information. The pulse amplitudes in the graphs 210, 220, 230, 240 can be used individually or averaged over all receivers in an array, or over a number of acquisition cycles, to improve the signal to noise ratio of the reflected signals. Thus, another set of measurements in the process of determining formation density is taken using ultrasonic receivers 106.

Figure 3:
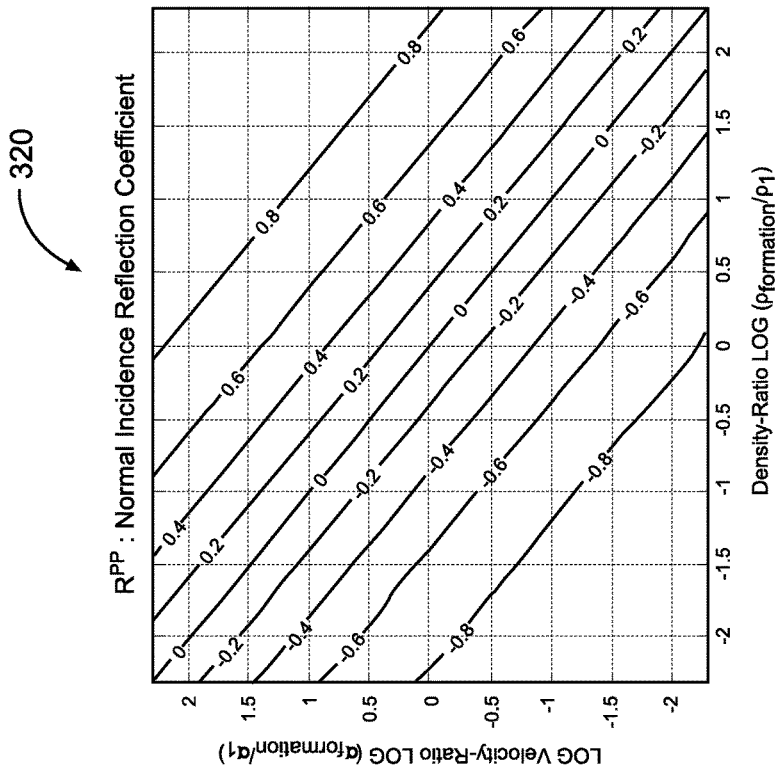
FIG. 3 includes linear and logarithmic graphs of the normal incidence reflection coefficient as a function of velocity and density ratios between the drilling fluid and the formation, according to various embodiments of the invention.
Figure 3:
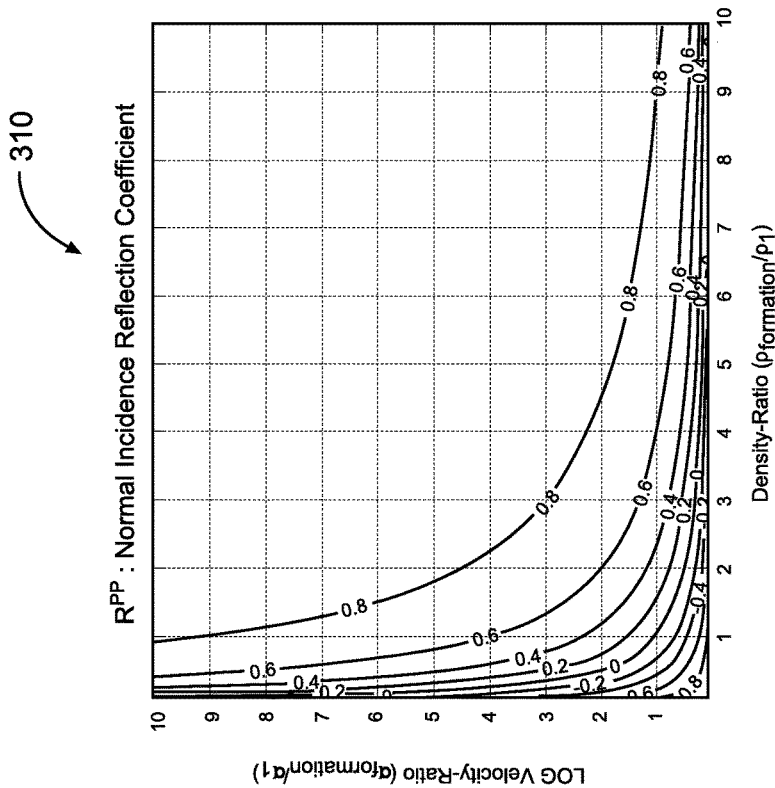

FIG. 3 includes linear and logarithmic graphs 310, 320 of the normal incidence reflection coefficient $R^{PP}$ as a function of velocity and density ratios between the drilling fluid and the formation, according to various embodiments of the invention. The normal incidence reflection coefficient $R^{PP}$ is the amplitude of the reflected wave, when the incident wave has a unit amplitude, and is perpendicular to the interface upon which it impinges. Here the values of $R^{PP}$ range from −0.8 to +0.6.

The normal incidence reflection coefficient $R^{PP}$ can be expressed as the contrast of the acoustic impedance (ρV, density times velocity) in the drilling fluid (subscript 1) and the formation (subscript 2), as shown in equation (1) below:

$$R^{PP} = \frac{\rho_1 V_1 - \rho_2 V_2}{\rho_1 V_1 + \rho_2 V_2} \quad (1)$$

Thus, $\rho_1$ is the fluid density, and $\rho_2$ is the formation density. $V_1$ is the fluid velocity, and $V_2$ is the formation velocity. Equation (1) can be modified to include non-normal incidence if desired, as those of ordinary skill in the art will realize after reading the content of this disclosure, and reviewing the associated figures.

Figure 4:
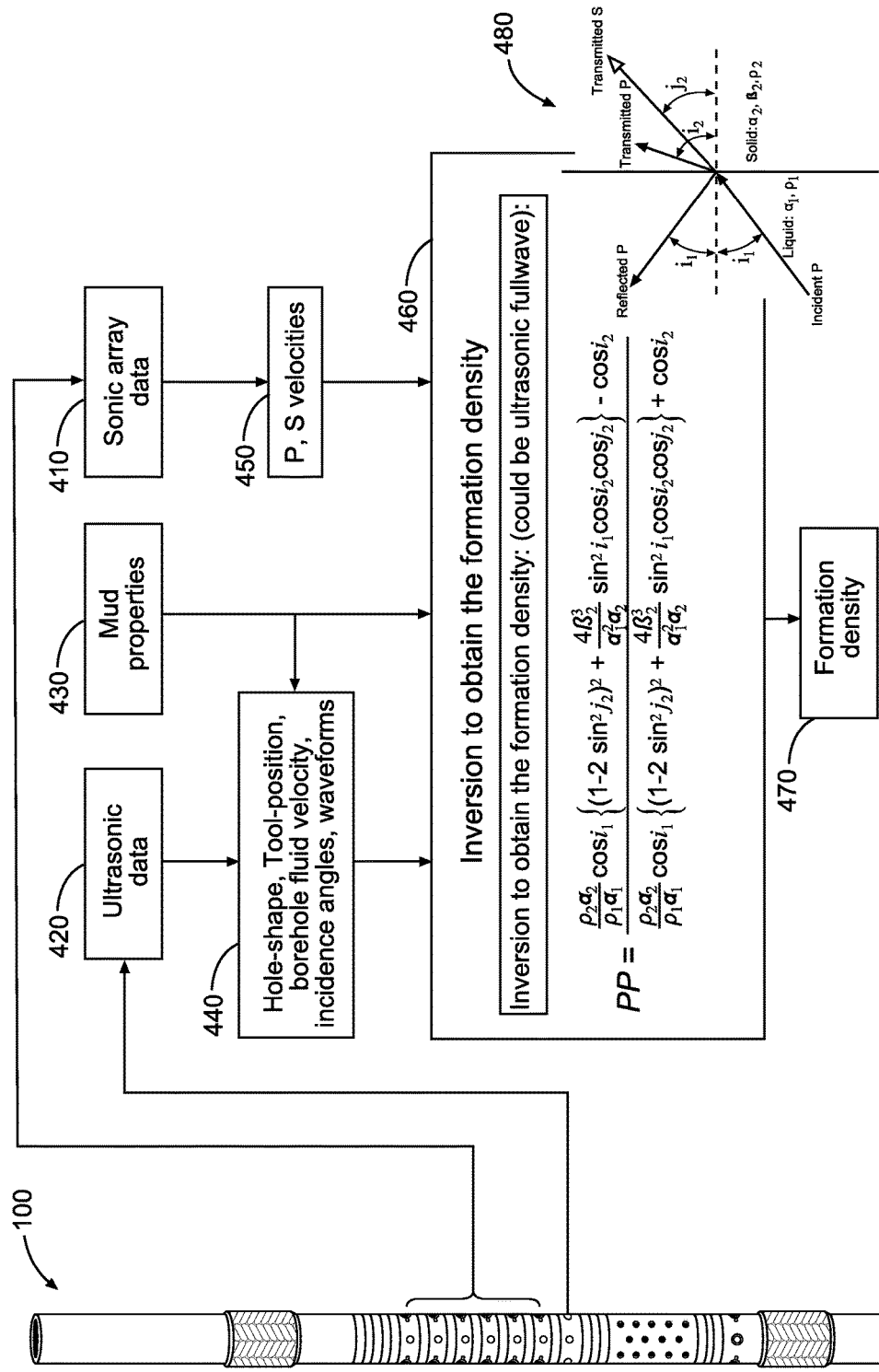
FIG. 4 is a work flow diagram that can be used to determine geological formation density according to various embodiments of the invention.

FIG. 4 is a work flow diagram that can be used to determine geological formation density according to various embodiments of the invention. Here, an apparatus 100, similar to or identical to the apparatus 100 shown in FIG. 1 is used to obtain sonic and ultrasonic measurements, as described previously, as part of the activity for blocks 410, 420, respectively. The mud velocity and other mud properties are determined as part of the activity at block 430.

From the slowness measurement made over the sonic receiver arrays in block 410, for example, the velocity of the formation can be obtained. Combined with the acoustic impedance derived from the ultrasonic caliper measurements in block 420, the formation density can be obtained as a result at block 470, after inversion at block 460, since the density equals the impedance divided by the velocity.

The inversion at block 460 is an attempt to match theoretical and known values, to find the formation density $\rho_2$. Intermediate values which feed the inversion process include hole shape, tool position, fluid velocity, incidence angles, and waveforms taken from block 440 (which can be derived from the ultrasonic measurement data provided by block 420 and the mud properties provided by block 430), along with shear and compression wave velocities from block 450 (which can be derived from the sonic array measurement data provided by block 410), each of which can be obtained individually, as is known to those of ordinary skill in the art. The inversion property relationships, based on measuring the characteristics of incident and reflected waves, can be seen in the inset diagram 480.

Figure 5:
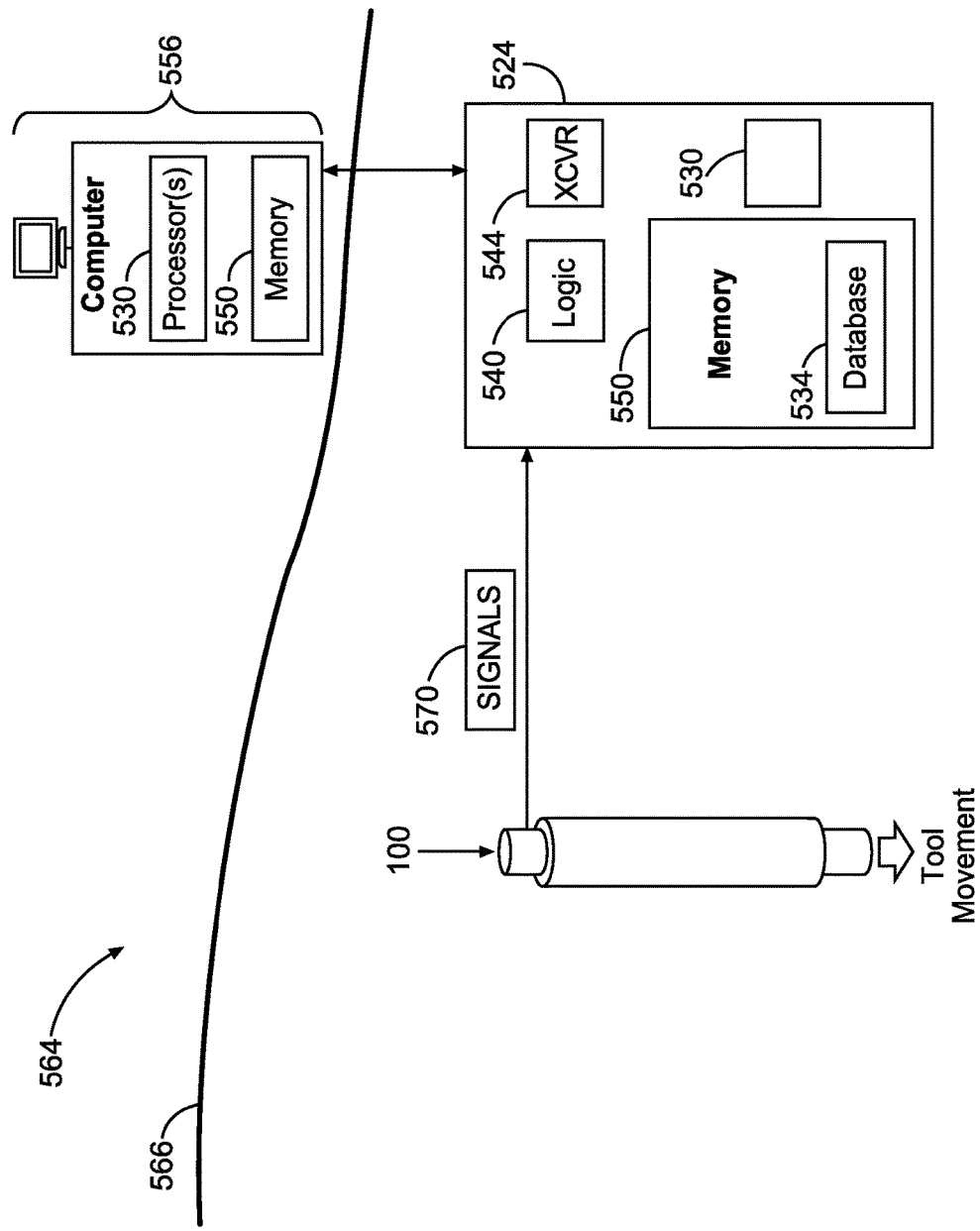
FIG. 5 is a block diagram of apparatus and systems according to various embodiments of the invention.

FIG. 5 is a block diagram of apparatus 100 and systems 564 according to various embodiments of the invention. The apparatus 100 may be similar to or identical to the apparatus 100 shown in FIG. 1. For example, referring to FIGS. 1 and 4, the apparatus 100 may comprise a housing 104 attached to one or more sonic transmitters 102, one or more sonic sensors 108, and one or more ultrasonic sensors 106. The sensors 106, 108 operate to measure formation and borehole characteristics by providing down hole log data 570, in the form of signals. This data 570 may be collected under the control of circuit logic 540, perhaps as part of a data acquisition system 524. The logic 540 may operate to transform the signals 570 into data values representing the amplitude and other properties of the signals 570.

The apparatus 100 may further include one or more processors 530 in the housing 104. A transceiver 544 may be used to receive commands from a workstation 556, and to transmit the data 570, or a processed version of the data 570 (e.g., digital data values, or the estimated formation density), to the surface 566. The processors 530 may operate to calculate the density of the formation below the surface 566, based on the measurements forming part of the data 570 using various embodiments of the methods described herein. A memory 550 can be located in the housing 104, or in the workstation 556, or both, to store measurements as original log data 570, or a processed version of the log data, or both, perhaps in a database 534.

Thus, referring now to FIGS. 1-5, it can be seen that many embodiments may be realized. For example, a system 564 may comprise a housing 104, ultrasonic and sonic sensors 106, 108, and one or more processors 530. The processor 530 is used to determine formation density based on signals provided by the sensors 106, 108. The system 564 may further comprise a workstation 556, including one or more processors 530 and a memory 550.

In some embodiments, a system 564 comprises a housing 104, sonic sensors 108 attached to the housing 104, and ultrasonic sensors 106 attached to the housing 104. The system 564 includes at least one processor 530 to calculate the density of a geological formation based on values derived from signals 570 provided by the sonic sensors 108 and the ultrasonic sensors 106. This is accomplished by determining a compressional velocity (CV) of the geological formation from the values associated with the sonic sensors 108, determining a reflection coefficient (RC) associated with the geological formation from the values associated with the ultrasonic sensors 106, and determining the density of the geological formation based on the CV and the RC.

The processors 530 may be attached to the housing 104, or located in a workstation 556 at a surface 566 of the geological formation, or both. The ultrasonic sensors 106 may comprise caliper sensors, including pulse-echo sensors, or pitch-catch sensors. The sonic sensors 108 may comprise a sonic receiver array.

The system 564 may include multiple sonic sensor arrays. Thus, in some embodiments, the sonic sensors 108 comprise multiple sonic receiver arrays disposed around a periphery of the housing 104. In this case, each of the sonic receiver arrays can be used to receive the signal from one sonic transmitter 102 or multiple sonic transmitters 102, to determine the formation CV. The housing 104 may comprise a wireline tool, or a measurement/logging while drilling (MWD/LWD) tool.

Figure 6:
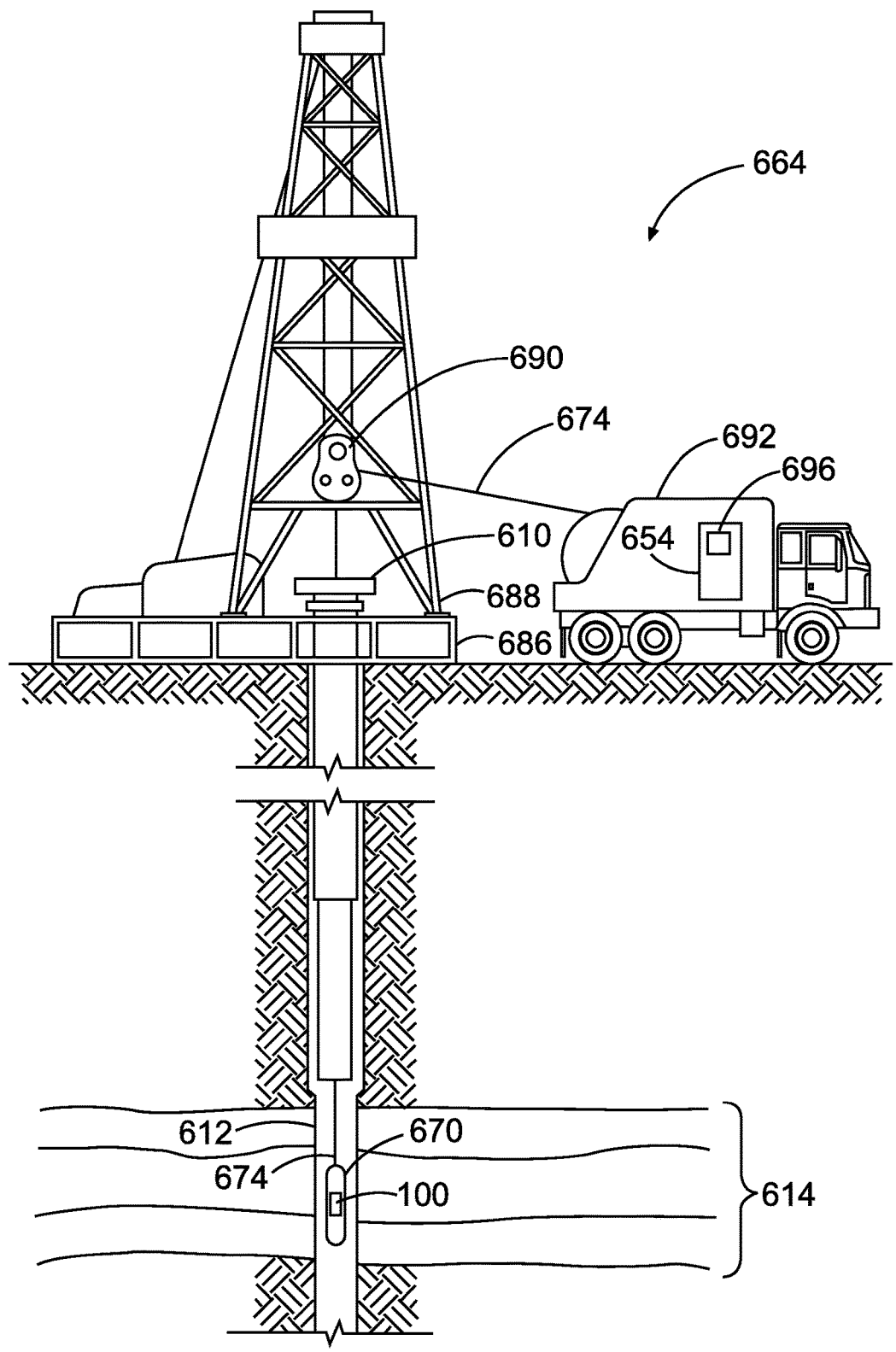
FIG. 6 illustrates a wireline system embodiment of the invention.
Figure 7:
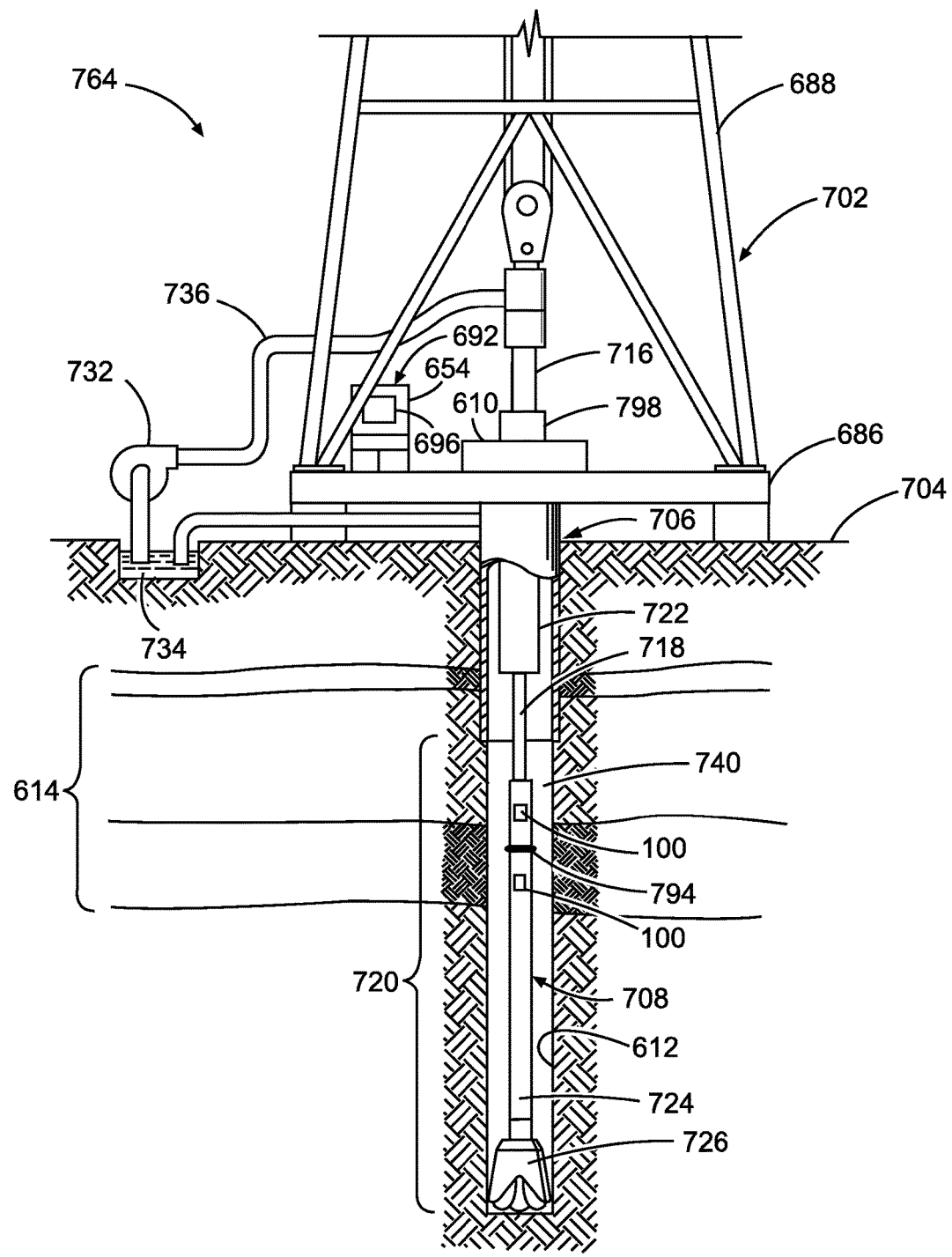
FIG. 7 illustrates a drilling rig system embodiment of the invention.

FIG. 6 illustrates a wireline system 664 embodiment of the invention, and FIG. 7 illustrates a drilling rig system 764 embodiment of the invention. Therefore, the systems 664, 764 may comprise portions of a wireline logging tool body 670 as part of a wireline logging operation, or of a down hole tool 724 as part of a down hole drilling operation.

Referring now to FIG. 6, a well during wireline logging operations can be seen. In this case, a drilling platform 686 is equipped with a derrick 688 that supports a hoist 690.

Drilling oil and gas wells is commonly carried out using a string of drill pipes connected together so as to form a drilling string that is lowered through a rotary table 610 into a wellbore or borehole 612. Here it is assumed that the drilling string has been temporarily removed from the borehole 612 to allow a wireline logging tool body 670, such as a probe or sonde, to be lowered by wireline or logging cable 674 into the borehole 612. Typically, the wireline logging tool body 670 is lowered to the bottom of the region of interest and subsequently pulled upward at a substantially constant speed.

During the upward trip, at a series of depths various instruments (e.g., portions of the apparatus 100, or system 564 shown in FIGS. 1 and 5) included in the tool body 670 may be used to perform measurements on the subsurface geological formations 614 adjacent the borehole 612 (and the tool body 670). The measurement data can be communicated to a surface logging facility 692 for processing, analysis, and/or storage. The logging facility 692 may be provided with electronic equipment for various types of signal processing, which may be implemented by any one or more of the components of the apparatus 100 or system 564 in FIGS. 1 and 5. Similar formation evaluation data may be gathered and analyzed during drilling operations (e.g., during LWD operations, and by extension, sampling while drilling).

In some embodiments, the tool body 670 is suspended in the wellbore by a wireline cable 674 that connects the tool to a surface control unit (e.g., comprising a workstation 556). The tool may be deployed in the borehole 612 on coiled tubing, jointed drill pipe, hard wired drill pipe, or any other suitable deployment technique.

Turning now to FIG. 7, it can be seen how a system 764 may also form a portion of a drilling rig 702 located at the surface 704 of a well 706. The drilling rig 702 may provide support for a drill string 708. The drill string 708 may operate to penetrate the rotary table 610 for drilling the borehole 612 through the subsurface formations 614. The drill string 708 may include a Kelly 716, drill pipe 718, and a bottom hole assembly 720, perhaps located at the lower portion of the drill pipe 718.

The bottom hole assembly 720 may include drill collars 722, a down hole tool 724, and a drill bit 726. The drill bit 726 may operate to create the borehole 612 by penetrating the surface 704 and the subsurface formations 614. The down hole tool 724 may comprise any of a number of different types of tools including MWD tools, LWD tools, and others.

During drilling operations, the drill string 708 (perhaps including the Kelly 716, the drill pipe 718, and the bottom hole assembly 720) may be rotated by the rotary table 610. Although not shown, in addition to, or alternatively, the bottom hole assembly 720 may also be rotated by a motor (e.g., a mud motor) that is located down hole. The drill collars 722 may be used to add weight to the drill bit 726. The drill collars 722 may also operate to stiffen the bottom hole assembly 720, allowing the bottom hole assembly 720 to transfer the added weight to the drill bit 726, and in turn, to assist the drill bit 726 in penetrating the surface 704 and subsurface formations 614.

During drilling operations, a mud pump 732 may pump drilling fluid (sometimes known by those of ordinary skill in the art as "drilling mud") from a mud pit 734 through a hose 736 into the drill pipe 718 and down to the drill bit 726. The drilling fluid can flow out from the drill bit 726 and be returned to the surface 704 through an annular area 740 between the drill pipe 718 and the sides of the borehole 612.

The drilling fluid may then be returned to the mud pit 734, where such fluid is filtered. In some embodiments, the drilling fluid can be used to cool the drill bit 726, as well as to provide lubrication for the drill bit 726 during drilling operations. Additionally, the drilling fluid may be used to remove subsurface formation cuttings created by operating the drill bit 726.

Thus, referring now to FIGS. 1-7, it may be seen that in some embodiments, the systems 664, 764 may include a drill collar 722, a down hole tool 724, and/or a wireline logging tool body 670 to house one or more apparatus 100, similar to or identical to the apparatus 100 described above and illustrated in FIG. 1. Components of the system 564 in FIG. 5 may also be housed by the tool 724 or the tool body 670.

Thus, for the purposes of this document, the term "housing" may include any one or more of a drill collar 722, a down hole tool 724, or a wireline logging tool body 670 (all having an outer surface, to enclose or attach to magnetometers, sensors, fluid sampling devices, pressure measurement devices, temperature measurement devices, transmitters, receivers, acquisition and processing logic, and data acquisition systems). The tool 724 may comprise a down hole tool, such as an LWD tool or MWD tool. The wireline tool body 670 may comprise a wireline logging tool, including a probe or sonde, for example, coupled to a logging cable 674. Many embodiments may thus be realized.

For example, in some embodiments, a system 664, 764 may include a display 696 to present information, both measured log data 570, and processed versions of the data 570 (e.g., estimated formation density), as well as database information, perhaps in graphic form. A system 664, 764 may also include computation logic, perhaps as part of a surface logging facility 692, or a computer workstation 556, to receive signals from transmitters and to send signals to receivers, and other instrumentation to determine properties of the formation 614.

Thus, a system 664, 764 may comprise a down hole tool body, such as a wireline logging tool body 670 or a down hole tool 724 (e.g., an LWD or MWD tool body), and portions of one or more apparatus 100 attached to the tool body, the apparatus 100 to be constructed and operated as described previously. The processor(s) 530 in the systems 664, 764 may be attached to the housing 104, or located at the surface 566, as part of a surface computer (e.g., in the surface logging facility 556 of FIG. 5).

The apparatus 100; transmitters 102; housing 104; sensors 106, 108; data acquisition system 524; processors 530; database 534; logic 540; transceiver 544; memory 550; workstation 556; systems 564, 664, 764; surface 566; data 570; rotary table 610; borehole 612; wireline logging tool body 670; logging cable 674; drilling platform 686; derrick 688; hoist 690; logging facility 692; display 696; drill string 708; Kelly 716; drill pipe 718; bottom hole assembly 720; drill collars 722; down hole tool 724; drill bit 726; mud pump 732; mud pit 734; and hose 736 may all be characterized as "modules" herein.

Such modules may include hardware circuitry, and/or a processor and/or memory circuits, software program modules and objects, and/or firmware, and combinations thereof, as desired by the architect of the apparatus 100 and systems 564, 664, 764 and as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

It should also be understood that the apparatus and systems of various embodiments can be used in applications other than for logging operations, and thus, various embodiments are not to be so limited. The illustrations of apparatus 100 and systems 564, 664, 764 are intended to provide a general understanding of the structure of various embodiments, and they are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, processor modules, embedded processors, data switches, and application-specific modules. Such apparatus and systems may further be included as sub-components within a variety of electronic systems, such as televisions, cellular telephones, personal computers, workstations, radios, video players, vehicles, signal processing for geothermal tools and smart transducer interface node telemetry systems, among others. Some embodiments include a number of methods.

Figure 8:
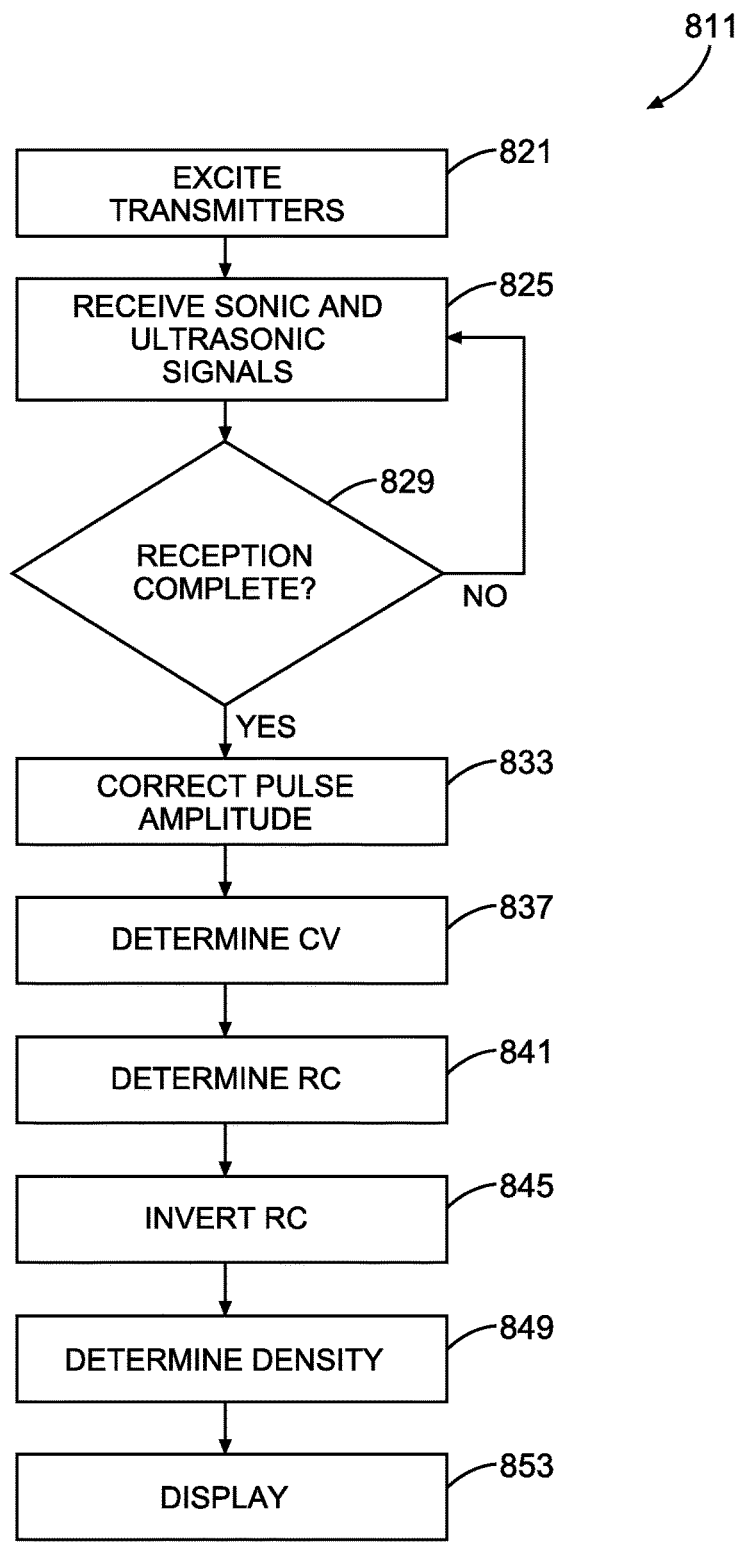
FIG. 8 is a flow chart illustrating several methods according to various embodiments of the invention.

For example, FIG. 8 is a flow chart illustrating several methods 811 according to various embodiments of the invention. For example, one method 811 may comprise determining a CV, determining an RC, and using both the CV and the RC to determine the formation density.

In some embodiments, a processor-implemented method 811, to execute on one or more processors that perform the method 811, begins at block 821 with exciting one or more transmitters to project sonic and ultrasonic waves into a geological formation.

The method 811 may continue on to block 825 to include receiving signals, including sonic and ultrasonic signals, in response to the excitation of the transmitters at block 821.

If reception of the signals is complete, as determined at block 829, then the method 811 may continue on to block 833. If the reception of signals has not yet been completed, then the method 811 may return to block 825, to continue the process of reception.

The pulse amplitude of received signals can be corrected for attenuation. Thus, the method 811 may include, at block 833, correcting the pulse amplitude of acquired signals for attenuation along a propagation path of the signals, where the acquired signals are associated with the RC.

The pulse amplitude correction may involve determining propagation path travel distance. Thus, the activity of correcting may comprise determining an actual distance traveled along the propagation path.

The propagation path travel distance can be determined using the signal travel time. Thus, determining the actual distance traveled may include determining a signal travel time.

The method 811 may continue on to block 837 to include determining the CV of the geological formation. Time semblance estimates can be used to determine the sonic CV. Thus, the CV may be obtained using time semblance estimates. The time semblance estimates can be obtained, in turn, by using individual or summed sonic array measurements. Thus, the time semblance estimate may be based on measurements from individual arrays or a sum of measurements from the arrays. In some embodiments, the sonic CV may be determined as an average velocity. Thus, the CV may comprise an averaged formation compressional velocity between a sonic source array and a sonic receiver array, or across the receiver array.

The method 811 may continue on to block 841 with determining an RC associated with the geological formation. The RC can be estimated using reflected pulse amplitudes and travel times in a borehole. Thus, the activity at block 841 may comprise estimating the RC based on borehole reflected pulse amplitude (corrected or uncorrected) and propagation path travel time.

The reflected pulse amplitude may be determined as an average amplitude. Thus, the reflected pulse amplitude may be averaged over a number of acquisition cycles.

The RC can be estimated using an impedance ratio function, such as a product of velocity and density. The impedance ratio may include various combinations of velocity and density, such as products of velocity and density, for both the drilling fluid and the formation.

For example, the impedance ratio function may have the form of A/B, wherein A comprises a difference of density and velocity products, and B comprises a sum of the density and velocity products. The density and velocity products may include drilling fluid density and velocity, and density and velocity of the geological formation.

Drilling fluid velocity can be estimated in a number of ways. For example, the drilling fluid velocity can be estimated from a known target distance or a direct surface measurement.

The estimated RC can be inverted to match theoretically determined values. Thus, the method 811 may continue on to block 845 to include inverting the RC to reduce a variation between the RC and a theoretical reflection coefficient.

The method 811 may continue on to block 849 to include determining the density of the geological formation based on the CV and the RC, as described previously.

In some embodiments, the sonic and ultrasonic measurements, corrected pulse amplitudes, the CV, the RC, and the density, are displayed. Thus, the method 811 may continue on to block 853 to include displaying the CV, the RC, and the density in graphic form, perhaps on the display of a workstation.

It should be noted that the methods described herein do not have to be executed in the order described, or in any particular order. Moreover, various activities described with respect to the methods identified herein can be executed in iterative, serial, or parallel fashion. For example, the activity of block 841 may occur at about the same time, or even prior to the activity of block 837 in some embodiments. In addition, the various elements of each method (e.g., the methods shown in FIGS. 4 and 8) can be substituted, one for another, within and between methods. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those skilled in the art, such as application program interfaces or interprocess communication techniques, including remote procedure calls. The teachings of various embodiments are not limited to any particular programming language or environment. Thus, other embodiments may be realized.

Figure 9:
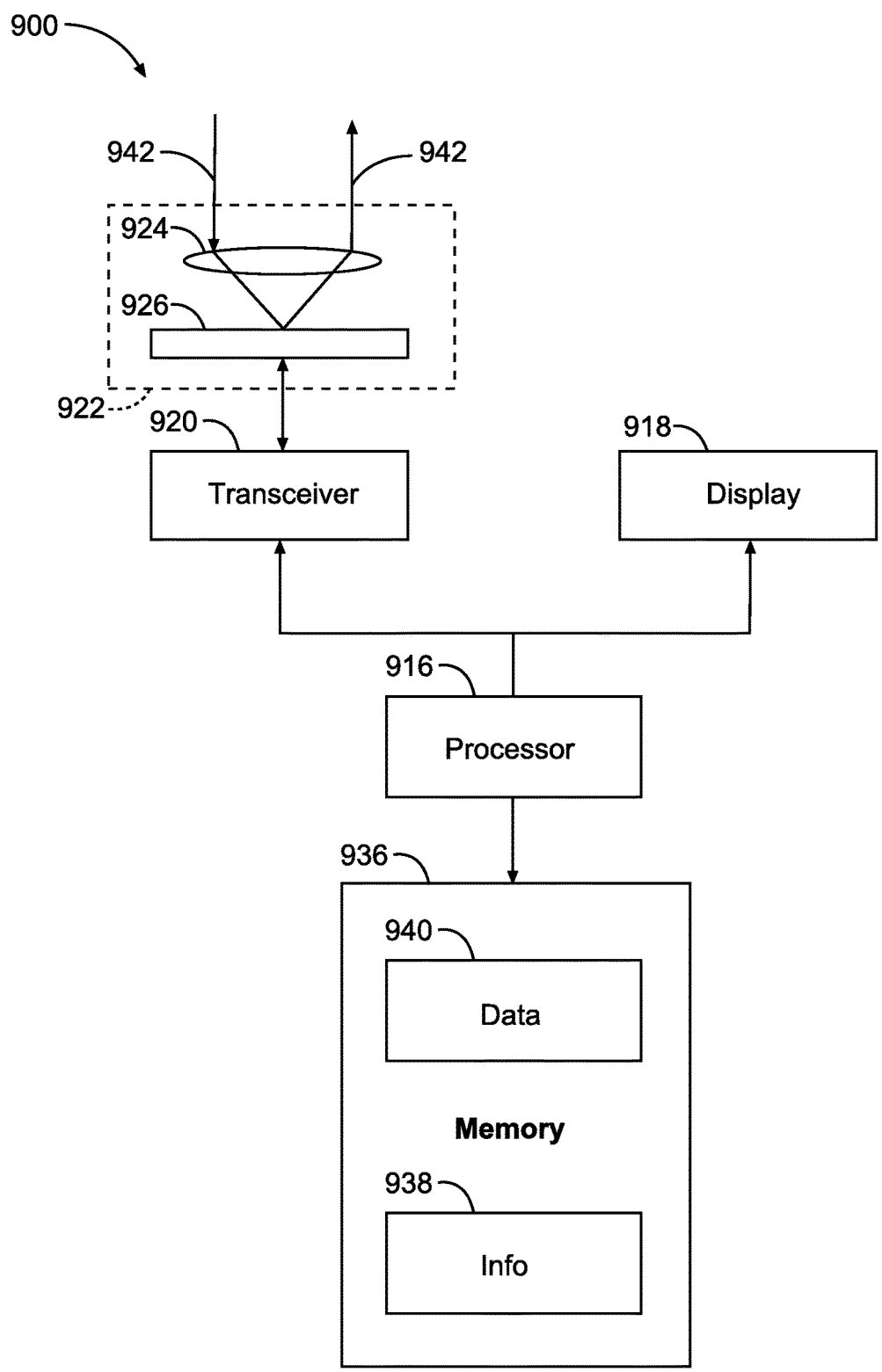
FIG. 9 is a block diagram of an article according to various embodiments of the invention.

For example, FIG. 9 is a block diagram of an article 900 of manufacture according to various embodiments, such as a computer, a memory system, a magnetic or optical disk, or some other storage device. The article 900 may include one or more processors 916 coupled to a machine-accessible medium such as a memory 936 (e.g., removable storage media, as well as any tangible, non-transitory memory including an electrical, optical, or electromagnetic conductor) having associated information 938 (e.g., computer program instructions and/or data), which when executed by one or more of the processors 916, results in a machine (e.g., the article 900) performing any actions described with respect to the methods of FIGS. 4 and 8, the apparatus of FIGS. 1 and 5, and the systems of FIGS. 5-7. The processors 916 may comprise one or more processors sold by Intel Corporation (e.g., members of the Intel® Core™ processor family), Advanced Micro Devices (e.g., AMD Athlon™ processors), and other semiconductor manufacturers.

In some embodiments, the article 900 may comprise one or more processors 916 coupled to a display 918 to display data processed by the processor 916 and/or a wireless transceiver 920 (e.g., a down hole telemetry transceiver) to receive and transmit data processed by the processor.

The memory system(s) included in the article 900 may include memory 936 comprising volatile memory (e.g., dynamic random access memory) and/or non-volatile memory. The memory 936 may be used to store data 940 processed by the processor 916.

In various embodiments, the article 900 may comprise communication apparatus 922, which may in turn include amplifiers 926 (e.g., preamplifiers or power amplifiers) and one or more antenna 924 (e.g., transmitting antennas and/or receiving antennas). Signals 942 received or transmitted by the communication apparatus 922 may be processed according to the methods described herein.

Many variations of the article 900 are possible. For example, in various embodiments, the article 900 may comprise a down hole tool. In some embodiments, the article 900 is similar to or identical to the apparatus 100 or system 564 shown in FIG. 5.

In summary, the apparatus, systems, and methods disclosed herein enable the calculation of an estimated formation density, based on sonic and ultrasonic formation measurements, helping to optimize identification and recovery of hydrocarbon reserves. Increased client satisfaction may result.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system, comprising:
   a housing;
   sonic sensors attached to the housing;
   ultrasonic sensors attached to the housing;
   a processor; and
   a machine-accessible medium comprising program instructions executable by the processor to cause the system to determine a compressional velocity (CV) of a geological formation based on sonic signals measured by the sonic sensors, determine a reflection coefficient (RC) associated with the geological formation based on ultrasonic signals measured by the ultrasonic sensors, and determine the density of the geological formation based on the CV and the RC.

2. The system of claim 1, wherein the ultrasonic sensors comprise at least one of caliper sensors, pulse-echo sensors, or pitch-catch sensors.

3. The system of claim 1, further comprising at least one sonic transmitter attached to the housing, wherein the sonic sensors comprise a sonic receiver array.

4. The system of claim 3, wherein the sonic receiver array comprises one of multiple sonic arrays disposed around a periphery of the housing.

5. The system of claim 1, wherein the housing comprises one of a wireline tool, a logging while drilling tool, or a measurement while drilling tool.

6. A method comprising:
   determining a compressional velocity (CV) of a geological formation based on sonic signals measured by one or more sonic sensors attached to a down hole tool;
   determining a reflection coefficient (RC) associated with the geological formation based on ultrasonic signals measured by one or more ultrasonic sensors attached to the down hole tool; and determining a density of the geological formation based on the CV and the RC.

7. The method of claim 6, wherein the CV is obtained using a time semblance estimate.

8. The method of claim 7, wherein the time semblance estimate is based on measurements from individual arrays or a sum of measurements from the individual arrays.

9. The method of claim 6, wherein the CV comprises an averaged formation compressional velocity.

10. The method of claim 6, further comprising:
inverting the RC to reduce a variation between the RC and a theoretical reflection coefficient.

11. The method of claim 6, wherein determining the RC comprises:
estimating the RC based on borehole reflected pulse amplitude and propagation path travel time.

12. The method of claim 11, wherein the RC is estimated using an impedance ratio function.

13. The method of claim 12, wherein the impedance ratio function has the form of A/B, wherein A comprises a difference of density and velocity products, and B comprises a sum of the density and velocity products, and wherein the density and velocity products comprise drilling fluid density and drilling fluid velocity, and density and velocity of the geological formation.

14. The method of claim 13, wherein the drilling fluid velocity is estimated from a known target distance or a direct surface measurement.

15. The method of claim 11, further comprising:
correcting the borehole reflected pulse amplitude for attenuation along a propagation path of acquired signals associated with the RC.

16. The method of claim 15, wherein the correcting comprises:
determining an actual distance traveled along the propagation path of acquired signals.

17. The method of claim 16, wherein determining the actual distance traveled comprises determining a signal travel time.

18. The method of claim 11, wherein the borehole reflected pulse amplitude is averaged over a number of acquisition cycles.

19. The method of claim 6, further comprises determining a fluid velocity based on ultrasonic signals measured by one or more ultrasonic sensors and determining a shear velocity based on sonic signals measured by one or more sonic sensors.

20. A machine-accessible medium having instructions stored therein, wherein the instructions are executable to cause a machine to:
determine a compressional velocity (CV) of a geological formation based on sonic signals measured by one or more sonic sensors attached to a down hole tool;
determine a reflection coefficient (RC) associated with the geological formation based on ultrasonic signals measured by one or more ultrasonic sensors attached to the down hole tool; and
determine a density of the geological formation based on the CV and the RC.

* * * * *